J. G. ELLENDT.
MOLDING MACHINE.
APPLICATION FILED OCT. 3, 1911.

1,064,718. Patented June 17, 1913.

Witnesses:

John G. Ellendt, Inventor
By his Attorney

UNITED STATES PATENT OFFICE.

JOHN G. ELLENDT, OF ROCHESTER, NEW YORK.

MOLDING-MACHINE.

1,064,718. Specification of Letters Patent. Patented June 17, 1913.

Application filed October 3, 1911. Serial No. 652,622.

*To all whom it may concern:*

Be it known that I, JOHN G. ELLENDT, a citizen of the United States, residing at Rochester, in the county of Monroe and State of New York, have invented certain new and useful Improvements in Molding-Machines, of which the following is a specification, reference being had therein to the accompanying drawing.

My invention relates to improvements in molding machines and has particular reference to and is shown in the accompanying drawings as a machine adapted to mold cement as artificial stone.

Figure 1:
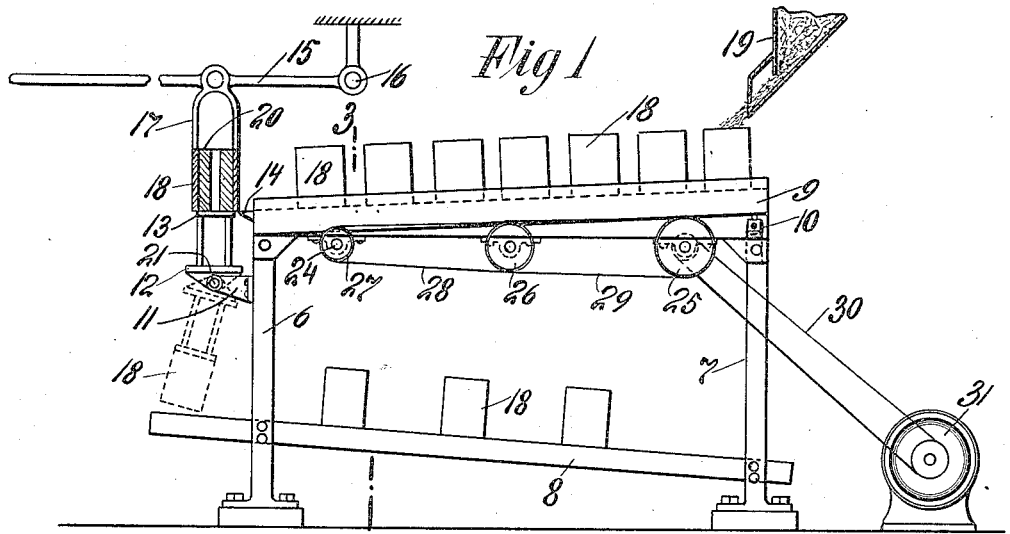
Figure 2:
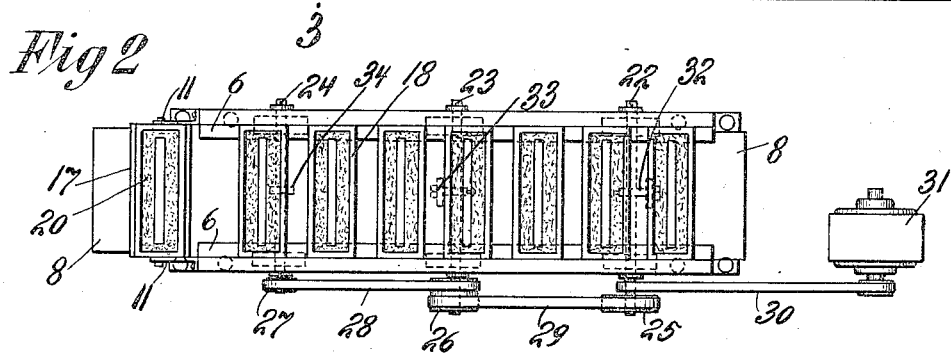
Figures 3, 4, 5:
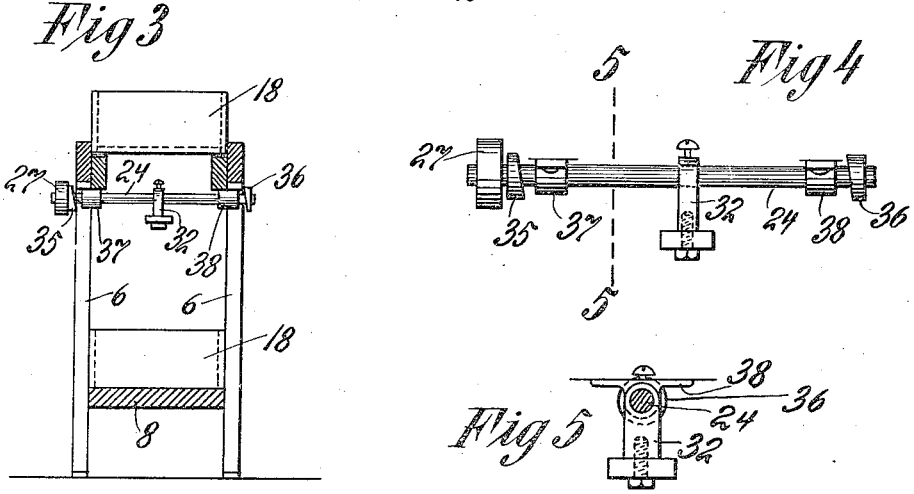

Referring to the accompanying drawings, Figure 1 is a side elevation partly in section illustrating a machine embodying my invention. Fig. 2 is a plan view of the same. Fig. 3 a cross section on the line 3—3 of Fig. 1. Fig. 4 is a plan view of one of the rotating shafts of the machine illustrating the means for causing vibration, and Fig. 5 a cross section of the same on the line 5—5 of Fig. 4.

6 and 7 are the standards of the machine at the lower extremity of which is secured the slideway 8. Upon the upper portion of the standards is secured a slideway 9 which may be raised and lowered at the right hand end by any well known means such as the screw 10. At the left of the machine is preferably provided suitable brackets such as 11 provided with a hinged shelf 12 carrying the platform 13 of the stripping mechanism. The slideway 9 is also provided with a projection 14 which comes close up to the side of the platform 13 and above the machine is preferably axially mounted the stripper mechanism comprising the bar 15 mounted upon the bearing 16 and provided with the axially mounted fork 17 which is adapted to engage the sides of the molds such as 18. These molds are placed upon the slideway 9 at the right hand end immediately beneath the discharging hopper 19 and as the mold is filled it is vibrated down the incline until it finally reaches the platform 13. By this time the cement has set sufficiently hard to allow the mold to be stripped from the block such as 20 or stone which has been formed and as the mold is forced down over the platform 13 the stone remains upon said platform from which it may be readily removed. The platform is then swung upon its bearing 21 to the position shown in dotted outline and the mold is thus placed upon the lower slideway and owing to the vibration of the machine feeds back again to the other end of the machine while it is again placed on top to be recharged.

The vibration of the machine is accomplished preferably in the following manner: The shafts 22 to 24 inclusive are rotatably mounted within the upper framework as shown and are provided with pulleys such as 25 to 27 inclusive which are suitably secured thereto. These pulleys are then driven by a suitable motor such as 31 by belts such as 28 to 30 inclusive. Each of the shafts 22 to 24 inclusive are provided with counterweights such as 32, 33 and 34 respectively and on referring more particularly to Figs. 3 and 4, it will be observed that each shaft is also provided with suitable cams at opposite extremities such as 35 and 36 mounted in opposite positions. 37 and 38 indicate the bearings within which the shaft 24 is mounted so that it will be seen that as the shaft 24 rides from side to side the cams 35 and 36 come in contact with the bearings 37 and 38 and the shaft is caused to vibrate from side to side of the machine and at the same time the counterweights such as 32 are rotating with the shaft causing further vibration. In designing the machine it is intended that the pulley 25 will revolve at approximately 1200 R. P. M., the pulley 26 at approximately 1500 R. P. M. and the pulley 27 at approximately 1800 R. P. M. This will of course give the necessary lateral and longitudinal vibration to cause the cement to set hard during its travel in the molds along the length of the machine.

Of course it will be understood that various modifications may be made without departing from the spirit of the invention as set forth in the claim.

I claim:

In a molding machine, a framework supporting a slideway, molds adapted to pass along said slideway, means for vibrating said slideway, means for filling said molds at the top of said slideway, means for stripping said molds at the foot of said slideway, said stripping means comprising a pivoted platform having uprights to receive the molded mass, and means for forcing the mold away from the same.

In testimony whereof I affix my signature in presence of two witnesses.

JOHN G. ELLENDT.

Witnesses:
 LOUISE ENDERLE,
 THOMAS A. HILL.

Copies of this patent may be obtained for five cents each, by addressing the "Commissioner of Patents, Washington, D. C."